United States Patent
Sun et al.

[11] Patent Number: 5,819,164
[45] Date of Patent: Oct. 6, 1998

[54] MODULATED RETROREFLECTION SYSTEM FOR SECURE COMMUNICATION AND IDENTIFICATION

[75] Inventors: Xiaoguang G. Sun, King of Prussia, Pa.; Richard W. Babbitt, Fair Haven, N.J.

[73] Assignees: The United States of America as represented by the Secretary of the Army, Washington, D.C.; Tracor Aerospace Electronic Systems, Inc., Lansdale, Pa.

[21] Appl. No.: 592,934
[22] Filed: Jan. 29, 1996
[51] Int. Cl.⁶ .......................... H01Q 15/00; H04B 7/00; G01S 13/78
[52] U.S. Cl. .................... 455/106; 342/6; 342/45
[58] Field of Search ................... 455/106, 107, 455/39, 42, 44, 69, 70, 73; 342/5, 6, 42, 44, 45, 51; 343/909, 911 R, 911 L, 912

[56] References Cited

U.S. PATENT DOCUMENTS

| Re. 26,548 | 3/1969 | Thomas . | |
|---|---|---|---|
| 2,872,675 | 2/1959 | Kennaugh . | |
| 3,308,464 | 3/1967 | Lewis . | |
| 3,417,398 | 12/1968 | Lewis et al. . | |
| 3,757,335 | 9/1973 | Gruenberg . | |
| 3,863,064 | 1/1975 | Doyle et al. . | |
| 4,090,204 | 5/1978 | Farhat . | |
| 4,209,689 | 6/1980 | Linford et al. . | |
| 4,589,740 | 5/1986 | Durremberger . | |
| 4,983,021 | 1/1991 | Fergason . | |
| 4,987,418 | 1/1991 | Kosowsky et al. | 342/6 |
| 5,245,352 | 9/1993 | Nalos et al. | 343/909 |
| 5,247,305 | 9/1993 | Hirata et al. | 342/44 |
| 5,254,997 | 10/1993 | Cohn . | |
| 5,274,379 | 12/1993 | Carbonneau et al. . | |
| 5,311,186 | 5/1994 | Utsu et al. | 342/51 |
| 5,355,241 | 10/1994 | Kelley . | |
| 5,424,737 | 6/1995 | Lindell | 342/5 |
| 5,583,507 | 12/1996 | D'Iespo et al. | 342/45 |

FOREIGN PATENT DOCUMENTS 1070702  12/1959  Germany .

OTHER PUBLICATIONS

*Proceedings of the Advanced Ceramic Technology for Electronic Applications Conference*, U.S. Army CECOM, Fort Monmouth, N.J., Sep. 28, 1993.

Primary Examiner—Reinhard J. Eisenzopf
Assistant Examiner—Lester G. Kincaid
Attorney, Agent, or Firm—Seidel, Gonda, Lavorgna & Monaco, PC

[57] ABSTRACT

A modulated retroreflection system for secure two-way communication and identification includes a transceiver at a first location and a transponder at a second location. The transponder receiving, modulating, and reflecting the signal back to the transceiver includes a retroreflector having a at least one reflective surface coated with an electro-responsive material. The electro-responsive material modulating the reflection coefficient of the reflective surface thereby modulating signals reflected by the surface. The transponder further includes a modulator electrically connected to the electro-responsive material for applying a modulated bias voltage thereby modulating the refractive index and consequently the electrical phase, and/or amplitude of the reflected signal.

15 Claims, 5 Drawing Sheets

- TRIHEDRAL HOST ($n_1$)
- CONDUCTIVE LAYER (CL) OXIDE ELECTRODE FOR BIASING VOLTAGE APPLICATION
- $Ba_x Sr_{1-x} TiO_3$ COAT, $\frac{\lambda}{4}$ THICK ($n_2$)
- TOTAL REFLECTION ($n_3$) METALIZATION

FIG.5
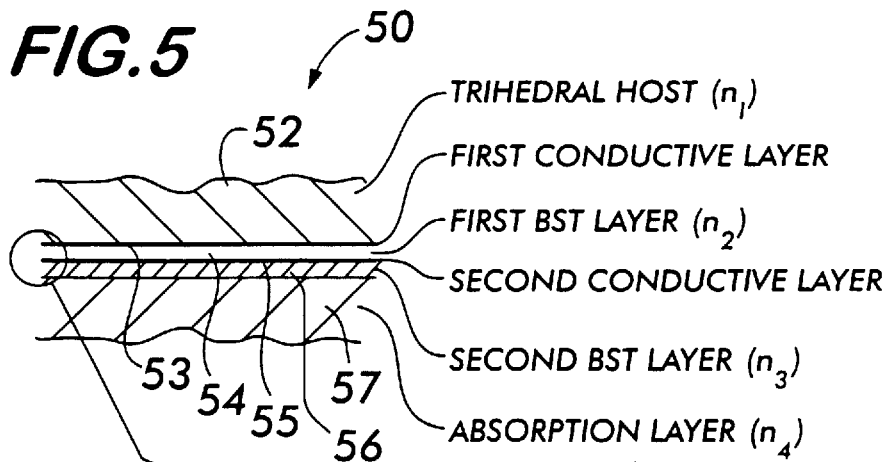
- 52 TRIHEDRAL HOST ($n_1$)
- 53 FIRST CONDUCTIVE LAYER
- 54 FIRST BST LAYER ($n_2$)
- 55 SECOND CONDUCTIVE LAYER
- 57 SECOND BST LAYER ($n_3$)
- 56 ABSORPTION LAYER ($n_4$)
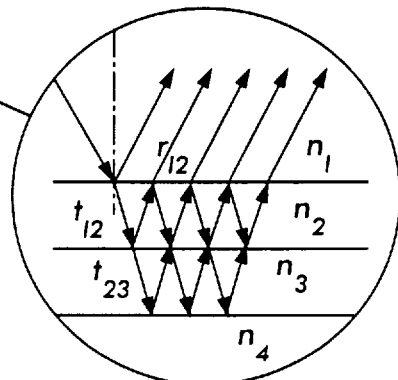
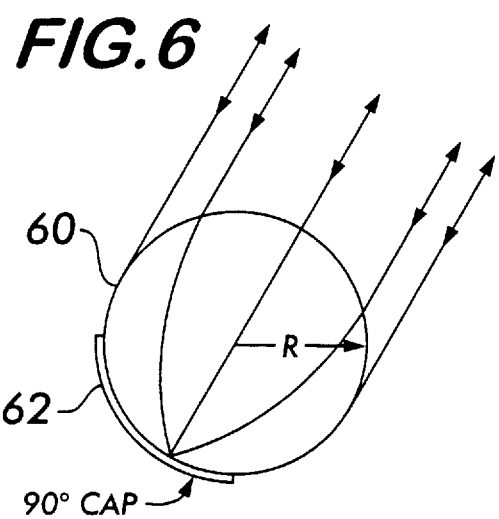
FIG.6
90° CAP
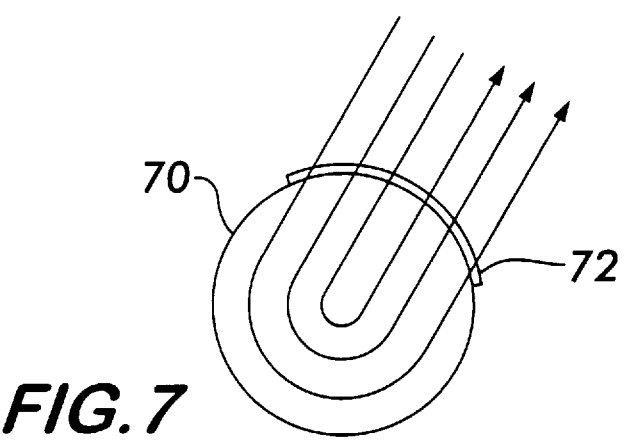
FIG.7

MODULATED RETROREFLECTION SYSTEM FOR SECURE COMMUNICATION AND IDENTIFICATION

GOVERNMENT INTEREST

The invention described herein may be manufactured, sold, imported, used and/or licensed by, or on behalf of, the Government of the United States of America without payment to the patent owner of any royalties thereon.

FIELD OF THE INVENTION

This invention relates to a secure semi-passive wireless communication and identification system employing modulation and retroreflection.

BACKGROUND OF THE INVENTION

Systems for communication and identification between two locations using modulators and retroreflectors are known in the art. For example, U.S. Pat. No. 3,757,335 describes a communication and control system which transmits and receives electromagnetic energy between two remotely located terminals in a sonic medium. The system includes retrodirective antenna arrays at each remotely located terminal. The retrodirective antenna arrays provide a retrodirective oscillating loop that is used to form the communication and control link between the two remote terminals. In another example, U.S. Pat. No. 5,355,241 describes an optical identification system which generates an unmodulated beam of light at a target retroreflector having a plurality of surfaces for reflecting the unmodulated beam back to the source. A second device, associated with the reflecting surfaces then modulates the beam by mechanically deforming the reflecting surfaces. Other communication and identification systems using retroreflectors and modulators are described in U.S. patents: U.S. Pat. No. Re. 26,548, U.S. Pat. Nos. 3,308,464, 3,757,335, 3,863,064, 4,090,204, 4,983,021, 5,254,997, and 5,424,737, and German Document AS-1,070,702.

Although the systems identified above describe communication and identification systems employing retroreflectors and modulators, there remain considerable shortcomings in the existing systems. One significant shortcoming with many of the prior art systems is that a plurality of modulating elements must be built onto the reflecting surfaces. Another shortcoming of the prior art systems, and consequence of the need for a plurality of modulating elements, is the necessity of complex and intricate circuity and control systems. Another significant shortcoming in many of the prior art communication and identification systems is that the reflected waves are mechanically modulated. Mechanical modulation has the effect of limiting the bandwidth and the long-term reliability of the system since modulation rates are limited to the mechanical response of the material. Yet another shortcoming in many prior art communication and identification systems that modulate the reflected wave is the need for additional or external modulation devices for modulating the reflected wave.

For example, in German Publication AS 1,070,702 an omni-directional radar reflector is described as having an antenna fabricated from a plurality of strips of rigid dielectric material. U.S. Pat. No. Re. 26,548, describes an optical communication system employing a retrodirectional reflector that mechanically modulates a reflected beam of light back in the direction of a source. Modulation of the reflected signal is achieved by the mechanical deformation of any one of three reflecting surfaces of a corner reflector. The mechanical modulation technique disclosed by this patent is that of a human voice acting directly upon a flexible surface of the retrodirectional reflector unit itself.

In U.S. Pat. No. 4,589,740, a mechanically deformable tri-rectangular trihedral reflector is described having a piezoelectric material for mechanically deforming the trihedral reflector surface. The material is used to contract or expand the reflecting surface thereby modulating an optical beam reflected by it. This device modulates the reflected light beam by mechanical stress deformation of the trihedral reflector. In U.S. Pat. No. 5,355,241, an IFF (identification friend or foe) discriminator is described as having an interrogator and a transponder utilizing a corner retro-reflector. The reflected signal is modulated with the aid of a piezoelectric strip applied to one of three surfaces that comprise the corner retro-reflector. Modulation of the surface is achieved by mechanical vibration caused by the contraction and expansion of the electronically controlled piezoelectric strip.

As for electro-mechanically produced modulation, U.S. Pat. No. Re. 26,548 describes the use of electronically actuated reflecting diaphragms to generate modulation on a reflected wave. In U.S. Pat. No. 4,090,204, an electronically steered antenna system is described using a reflective surface formed by an array of piezoelectric transducers. An incident wave is modulated by the piezoelectric transducer surface in a piecewise manner and then reflected back to the source. The array of piezoelectric transducers are described as being one or two wavelengths across a dielectric panel made of barium titanate. Also, in U.S. Pat. No. 4,983,021, a reflector system is described employing a liquid crystal shutter to modulate reflected incident electromagnetic light energy. This modulator reflector system employs a retroreflector for reflecting the light and a slow liquid crystal shutter for amplitude modulating the light on reflection.

Thus, there is still a need for a communication and identification system, employing a semi-passive highly directive retroreflector with an integrated signal modulation capability, that is fabricated as a single element of a reflecting surface. In addition, there is a need for a reflecting element that can provide communication and identification information by controlling either or both of the electrical phase and the amplitude of a reflected wave by means of a simple electrical input. The present invention fills that need.

SUMMARY OF THE INVENTION

The present invention is directed to a modulated retroflection system for secure semi-passive communication and identification comprising a transceiver at a first location and a transponder at a second location. The system supports at a one-way communication and identification link between the first and second locations. The terms IFF and identification are used interchangeably in this specification. The transponder receives, modulates, and reflects the signal back to the transceiver. The transponder comprises a retroreflector having a reflective surface incorporating an electro-responsive material. The electro-responsive material modulates the reflection coefficient of the reflecting surface thereby modulating the electrical phase and amplitude of the signal reflected by the surface. The transponder further comprises a modulator electrically connected to the electro-responsive material for applying a modulated bias voltage thereby modulating the refractive index and consequently the electrical phase, and/or amplitude of the reflected signal.

In accordance with another aspect on the invention the retroreflector is composed of a plurality of reflective surfaces coated with an electro-responsive material for independently controlling the electrical phase and amplitude of a reflected signal. As applied herein, coating and coated are used interchangeably with layer and layered. Also ceramic and ferroelectric are used interchangeably.

In yet another aspect on the invention the retroreflector is composed of a single reflective surface having a plurality of electro-responsive surfaces for independently controlling the electrical phase and amplitude of a reflected signal.

It is an object of the present invention to provide an improved device for secure semi-passive communication and identification. This and other features, aspects, and advantages of the present invention will become better understood with reference to the following descriptions, drawings, and appended claims.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 5 is a sectional view of a reflective surface coated with electro-responsive material, according to an alternative embodiment of the present invention.

FIG. 6 is a diagram of a Luneberg lens retroreflector associated with the modulated retroreflection system according to an alternative embodiment of the present invention.

FIG. 7 is a diagram of a dielectric sphere retroreflector associated with the modulated retroreflection system according to an alternative embodiment of the present invention.

DESCRIPTION OF THE PREFERRED EMBODIMENT

While the invention will be described in connection with a preferred embodiment, it will be understood that it is not intended to limit the invention to that embodiment. On the contrary, it is intended to cover all aspects, alternatives, modifications and equivalents as may be included within the spirit and scope of the invention as defined by the appended claims.

Figure 1:
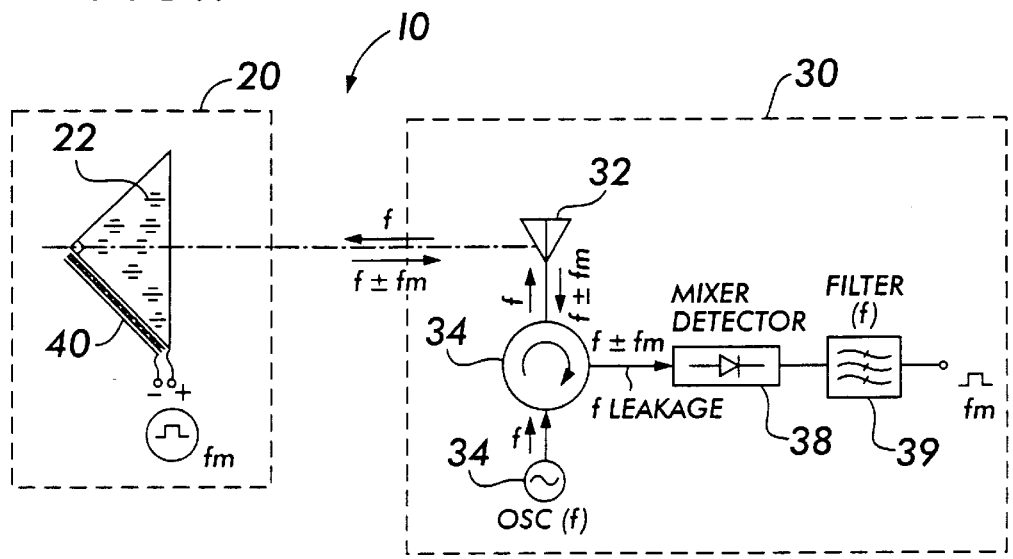
FIG. 1 is a diagram of a modulated retroreflection system for secure communication and identification according to a preferred embodiment of the present invention.

Referring to the drawings in detail, wherein like numerals indicate like elements FIG. 1 shows an overview of a preferred embodiment of a novel wireless communication and identification system 10. The communication and identification system 10 comprises an active transceiver 30 at a first position and a semi-passive transponder 20 at a second position. The transceiver 30 generates and transmits a highly-directed, electromagnetic interrogation signal to the transponder 20 at the second position.

The semi-passive transponder 20 receives and modulates the interrogation signal that is transmitted by the active transceiver 30. The signal is then passively reflected back to the source. The transponder 20 therefore does not actively generate energy at the carrier frequency. However, as energy is required to modulate the passively reflected signal, the transponder 20 is considered to be a semi-passive device.

In a preferred embodiment of the invention, the transponder 20 comprises a semi-passive highly-directional retroreflector having at least one electro-responsive reflecting surface.

Figure 3:
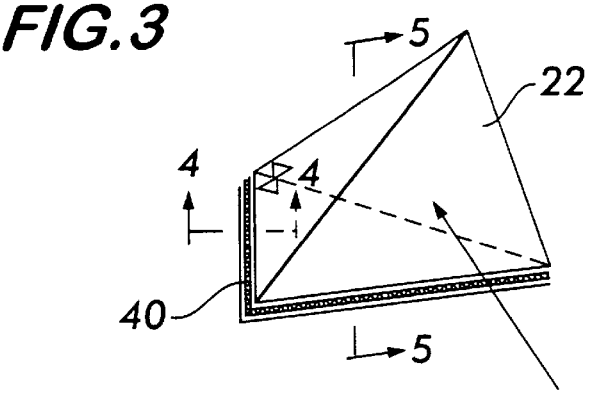
FIG. 3 is an isometric view of a corner retroreflector associated with the modulated retroreflection system according to a preferred embodiment of the present invention.

In accordance with one aspect of the present invention, the highly-directional retroreflector of the transponder 20 is preferably a corner reflector 22, having an electro-responsive reflecting surface 40. As shown in FIG. 3, the retroreflector 22 has three reflecting surfaces arranged in a substantially orthogonal configuration. The retroreflector 22 receives a signal transmitted by the transceiver 30, and modulates and reflects the signal back to the transceiver 30. Modulation is applied to the reflected signal by modulating the refractive index or reflection coefficient of the electro-responsive reflecting surface 40 of the retroreflector 22. By modulating the refractive index or the reflection coefficient of the electro-responsive reflecting surface 40, all energy in contact with the surface will be modulated when it is reflected. The relationship between the refractive index and reflection coefficient is explained below.

Figure 4:
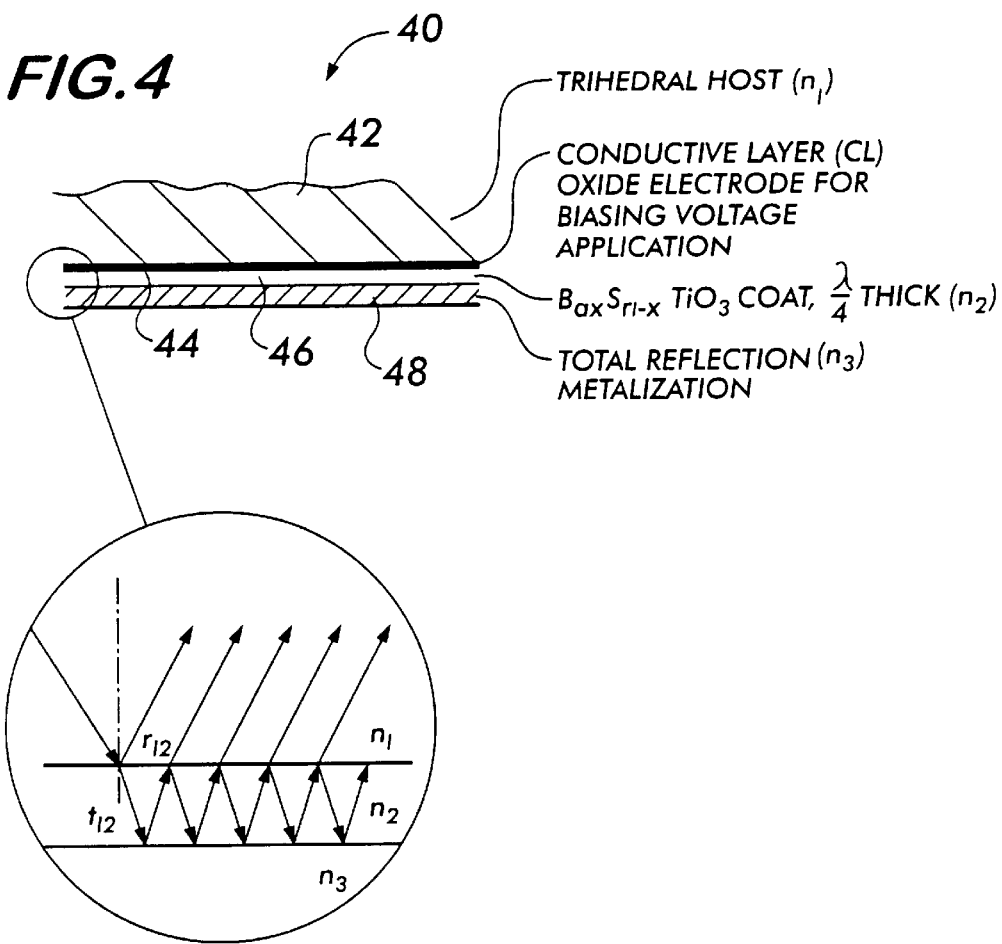
FIG. 4 is a sectional view of a reflective surface coated with electro-responsive material, taken along lines 4—4 in FIG. 3.
Figure 8:
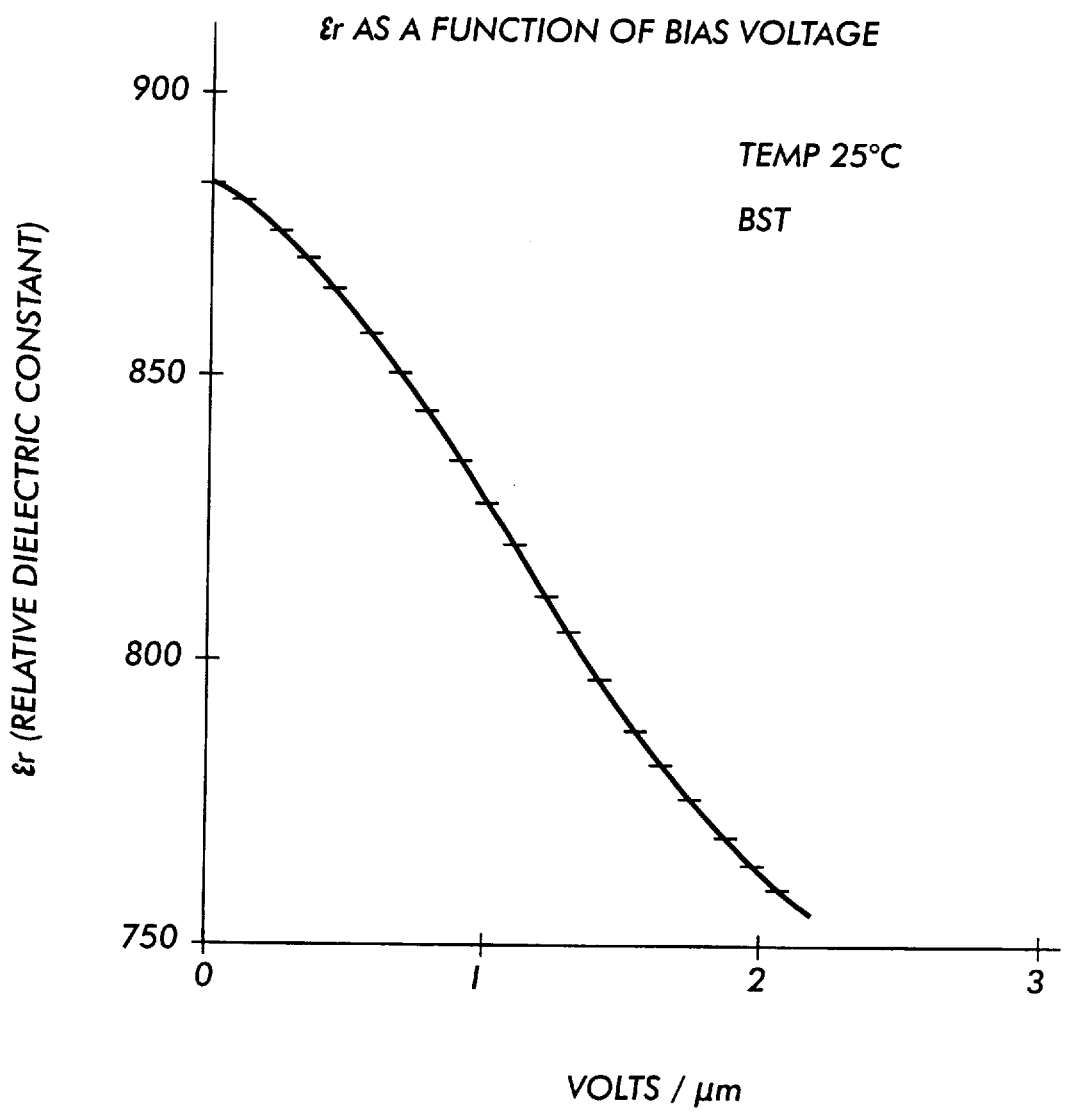
FIG. 8 is a plot of relative dielectric constant vs. bias voltage of a preferred embodiment of an electro-active surface of the present invention.

As shown in FIG. 4, phase modulation is achieved when the electro-responsive reflecting surface 40 comprises a dielectric trihedral host layer 42 having a refractive index $n_1$. An electrically thin conductive layer 44 is applied to the bottom of the trihedral host layer 42. Since this layer is transparent and much less than a tenth of a wavelength thick it does not contribute significant reflective or refractive properties to electromagnetic energy incident to the electro-responsive reflecting surface 40. Following the conductive layer 44 is a ceramic layer 46 comprising a ceramic coating whose refractive index and dielectric constant varies with a bias voltage. The bias voltage is applied to the ceramic layer 46 by the conductive layers 44 and 48, and enables the refractive index and dielectric constant of the ceramic layer 46 to be modulated. The ceramic layer 46 is backed by a total reflecting layer 48 which reflects all electromagnetic energy passing through the trihedral host layer 42, the conductive layer 44, and the ceramic layer 46.

In another aspect of the present invention, as shown in FIG. 5, phase modulation and amplitude modulation are achieved by stacking two electro-responsive layers in one reflecting surface. The electro-responsive reflecting surface 50 comprises a dielectric trihedral host layer 52 having a refractive index $n_1$. Following the trihedral host layer 52 is a first conductive layer 53 applied to the bottom of the trihedral host layer 52, and a first ceramic layer 54. A second conductive layer 55, insulated from the first ceramic layer 54, is applied to a second ceramic layer 56, which is followed by a conductive radio frequency absorbing layer 57. Since the conductive layers 53, 55 are transparent and much less than a tenth of a wavelength thick they do not contribute significant reflective or refractive properties to electro-magnetic energy incident to the electro-responsive reflecting surface 50.

The ceramic layers 54, 56, include a ceramic coating whose refractive index and dielectric constant varies with a bias voltage. The bias voltage is applied independently to each ceramic layer 54, 56 by the conductive layers 53, 55, and 57 enabling the refractive index and dielectric constant of each ceramic layer 54, 56 to be modulated independently.

The second ceramic layer 56 is backed by the absorbing layer 57 to accommodate amplitude modulation. The second ceramic layer 56 is modulated such that the reflection coefficient is changed to allow the signal to be absorbed or reflected as required for proper amplitude modulation of the reflected signal. Therefore absorbing layer 57 absorbs the electro-magnetic energy passing through the trihedral host layer 52, the conductive layers 53, 55, and the ceramic layers 54, 56.

The ceramic layer of the present invention is a material comprising a mixture of barium, strontium, titanate, and oxygen, ($Ba_x Sr_{1-x} TiO_3$), also referred to herein as BST. The designation "x" represents a fraction between 0, and typically is a value in the preferred range of "0.4" to "0.7." By the application of a bias voltage or a temperature gradient, the dielectric constant, or refractive index of that surface can be changed to a specified percentage. In one aspect of the present invention, the dielectric constant or refractive index of the surface can be changed by as much as 20 percent. However, any percentage change can be achieved as a consequence of the magnitude of the bias voltage applied and the material composition of the ceramic layer.

By modulating the bias voltage, the refractive index of the ceramic layer is modulated thereby causing the signal reflected by the surface to be modulated. Therefore, a significant feature of all aspects of the present invention is that no moving parts are required to modulate the reflected signal.

In accordance with another aspect of the present invention, as shown in FIG. 6, other types of retroreflectors may be employed such a Luneburg lens 60 having a ceramic coated electro-responsive reflecting surface 62.

In accordance with yet another aspect of the present invention, as shown in FIG. 7, a retroreflector having a dielectric spherical lens 70 and a ceramic coated electro-responsive reflecting surface 72 may be employed.

In a preferred embodiment of the secure semi-passive wireless communication and remote identification system of the present invention the preferred frequency range of operation of modulated retroreflection is in the microwave or millimeter wave spectrum (1 to 300 GHz). Modulated retroreflection is achieved by utilizing a ceramic material comprising a mixture of barium, strontium, titanate, and oxygen ($Ba_x Sr_{1-x} TiO_3$) that is incorporated into the reflection surface of the retroreflector as described above.

Ferroelectric materials such as $Ba_x Sr_{1-x} TiO_3$ have two main regions of behavior as a function of temperature. These are known as the ferro-electric and para-electric regions with the transition temperature being the Curie point. The ferro-electric region has hysteresis effects with electric field. From a practical perspective, hysteresis would yield less predictable phase shifting behavior with respect to the field. Therefore, there is some preference for operating in the para-electric region. A general rule is to operate in the para-electric region, at least 10° above 0° C. The Ba to Sr ratio also affects the dielectric constant (s) and the change of dielectric constant with applied voltage (Δs). A Ba to Sr ratio of 60:40 is preferred; however, any ratio may be developed as required to achieve a desired phase shifting behavior.

Ferroelectric compositions can be used as an electrical delay line as well. The amount of delay is determined by the distance a signal must travel through the ferroelectric material and the permittivity of the ferroelectric. Assuming a fixed thickness, the permittivity of a ferroelectric like BST can be changed by the applied electric field. This characteristic makes it possible to create many different delays for a selected length (thickness) of ferroelectric material.

Particular forms of ceramic material comprising a mixture of barium, strontium, titanate, and oxygen have recently been developed and perfected. These fabrication techniques are described in the *Proceedings of the Advanced Ceramic Technology for Electronic Applications Conference*, U.S. Army CECOM, Fort Monmouth, N.J., Sep. 28, 1993, and are incorporated herein by reference.

According to one aspect of the present invention, upon the application of a bias voltage or a temperature gradient to the ceramic layer, the refractive index and the dielectric constant of the material will change significantly. The electrical voltage is applied by an electrically thin conductive layer 44 such as shown in FIG. 4. Such a conductive layer is preferably less than 200 Å in thickness, and is comprised of a material such as indium tin oxide (ITO).

In order to modulate the reflected signal a sufficient modulation index must be achieved. For example, the modulation index on the reflection coefficient is a product of the effective total reflection coefficient r of a boundary with a coating as a result of multiple reflections. The total reflection coefficient for two adjacent dielectric layers is described according to, $$r = r_{12} + t_{12}e^{jk_2d}r_{23}e^{jk_2d}t_{21} + t_{12}e^{jk_2d}r_{23}e^{jk_2d}r_{21}e^{jk_2d}r_{23}e^{jk_2d}t_{21} + \ldots, \quad (1)$$

such that, $$r = r_{12} + t_{12}t_{21}\sum_{m=1}^{\infty} r_{21}^{m-1}r_{23}^m e^{j2mk_2d} = r_{12} + \frac{t_{12}t_{21}r_{23}^m e^{j2k_2d}}{1 - r_{21}r_{23}e^{j2k_2d}} \quad (2)$$

where, $$k_i = \frac{2\pi}{n_i\lambda_0}, \quad r_{ij} = \frac{n_i - n_j}{n_i + n_j}, \quad t_{ij} = \frac{2n_i}{n_i + n_j}, \quad \text{and} \quad i, j = 1, 2, 3$$

at normal incidence. A change in the bias voltage across the ceramic layer having a thickness d, results $n_i$ in a corresponding change in refractive index $n_i$. The change in the refractive index $n_j$ as can be seen from the right-hand side of Eq. (2), will result in a corresponding variation in the reflection coefficient r.

The modulation index $n_i$ is maximized for a given bias voltage by selecting the mixture of barium, strontium, titanate, and oxygen ($Ba_x Sr_{1-x} TiO_3$) incorporated into the reflection surface.

The ceramic material coating on the reflection surface can effect any type of modulation on the electrical phase and/or the amplitude of the reflected wave. Although any type of modulation technique may be applied, binary phase shift keying (BPSK) modulation of the reflected wave is preferred.

In accordance with the communication and identification system of the present invention, a trihedral (a three sided) corner retroreflector designed for BPSK operation is described. A trihedral corner retroreflector may have any one, or all three of the reflecting surfaces of the corner retroreflector constructed with an electro-responsive reflecting surface. However, for simplicity, FIG. 3 shows a trihedral corner retroreflector 22 having a single electro-responsive reflecting surface 40. When all three surfaces are coated, there are more degrees of freedom for modulation and polarization considerations.

When an incident electro-magnetic wave is presented to the broadside of the trihedral as shown in FIG. 3, the incident angle to a side surface is 54.7° or $\arcsin\sqrt{2/3}$. Phase shifting also referred to as phase modulation of the reflected signal is implemented by constructing the reflecting surface with a ceramic layer 46 having a thickness that is equivalent to a quarter wavelength ($\lambda/4$) at the midpoint of the dielectric variation range. The thickness of the ceramic layer 46 is therefore a function of the desired operating frequency of the system.

Figure 9:
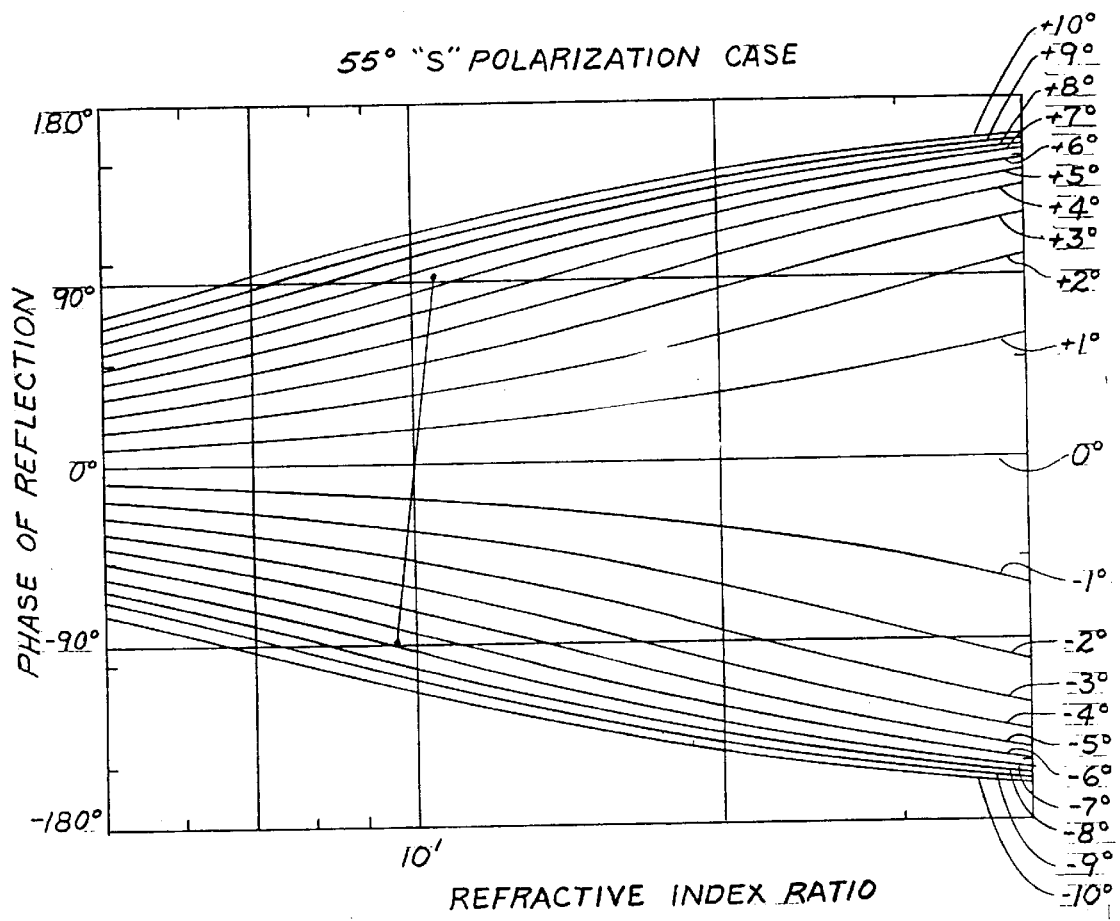
FIG. 9 is a plot of phase of reflection and electrical thickness variation of the coating vs. refractive index ratio of a preferred embodiment of an electroactive interface of the present invention.

The ceramic layer is backed by a total reflection coating 48 as shown in FIG. 4. In FIG. 9, a design chart is shown with a family of curves representing "s"-polarization. "S"-polarization represents the phase of the reflected signal as a function of refractive index ratio and tuning phase angle. The refractive index ratio is defined as the ratio of the ceramic layer's refractive index to that of the trihedral host. Also shown in FIG. 9 is a tunable parameter conversion table illustrating the relationship among phase angle tuned ($\Delta\phi$), refractive index tuned ($\Delta n$), and dielectric constant tuned ($\Delta\epsilon$). Tunability is achieved by a voltage bias on the ferroelectric layer resulting in variations or the parameters $\Delta\phi$, $\Delta n$, $\Delta\epsilon$.

For example, a solid trihedral host having a relative dielectric constant ($\epsilon_r$) of 4, and a quarter wavelength ($\lambda/4$) thick ceramic layer having an average dielectric constant ($\epsilon_1$) of 400, and a dielectric tuning range of ±7.3% (or ±6.5°) will produce a shift in the phase of reflection between +90° and −90°, thereby producing a BPSK modulation. By applying a voltage bias to the ceramic layer the dielectric constant can of the ceramic layer can be varied to produce the dielectric tuning range. In a preferred embodiment, the dielectric tuning range represents a dielectric constant between 350 and 400.

A retroreflector with this structure has several advantages over the prior art. For example, communication security is enhanced by the high directivity of the retroreflector, and because the reflected energy reflects only toward the direction of origination regardless of the direction of arrival. The communication is secure in the sense that it cannot be easily detected unless a sensor is in the direct line-of-sight between the first and second location. The communication is also resistant to broad spectrum interference and jamming, particularly since the transceiver employs a homodyne coherent receiver for demodulation detection.

In a preferred aspect of the present invention, as shown in FIG. 1, the transceiver 30 comprises a frequency source oscillator 36 connected to a bi-directional antenna 72 through a circulator 34. The transceiver 30 further comprises a mixer detector 38 and a frequency filter 39 for detecting and filtering the reflected signal. An interrogation signal is generated by the oscillator 36 and transmitted by the antenna 32 to the transponder 20. The transponder reflects the signal back, where it is received by the antenna 32 and fed into the mixer detector 38. The mixer detector 38 is a passive mixer in which a baseband signal is produced by simple cancellation of the received signal and a reference signal provided by a leakage signal through the circulator 34. This technique of passive coherent mixing is well known in the art and therefore will not be explained in detail herein. The baseband signal is detected and then filtered for use by the communication and identification system.

Figure 2:
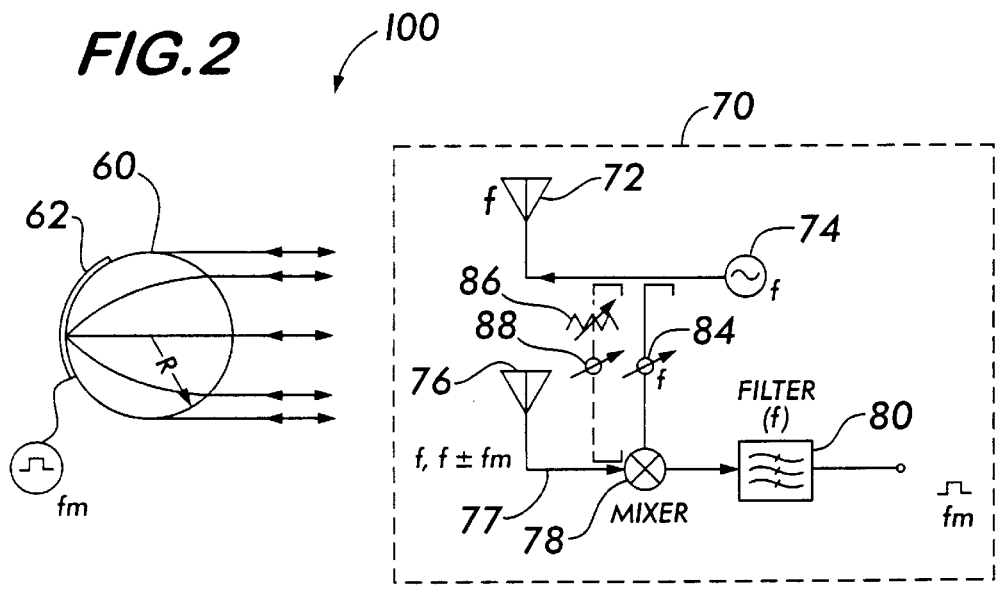
FIG. 2 is a diagram of a modulated retroreflection system for secure communication and identification according to an alternative embodiment of the present invention.

In yet another aspect of the present invention, as shown in FIG. 2, a communication and identification system 100, having a transceiver 70, comprises a transmitting antenna 72 coupled to a frequency source oscillator 74 for transmitting a signal to a transponder having a spherical retroreflector 60.

It is to be understood that any type of retroreflector may be used with any type of transceivers, and therefore may not be limited merely to the configurations illustrated herein. For example, transceiver 70 can be used to replace transceiver 30 in FIG. 1.

The receiving antenna 76 receives a signal reflected by the retroreflector 60. The signal is feed by a transmission line 77 to a mixer 78 for coherent detection with a reference signal provided by a coupler 84. A second compensating coupler 88 is connected between the receiving antenna 77 and the transmitting antenna 72 to eliminate transmission line delays and antenna coupling. The baseband signal produced by the mixer 78 is detected and then filtered by filter 80. The signal is then used by the communication and identification system.

Significant advantages are achieved by the present invention over the prior art. For example, a wide signal bandwidth is achieved by electronically controlling the refractive index of the ceramic layer as described above. The present invention, unlike other prior art systems, utilizes the refractive index of the ceramic layer comprising a mixture of barium strontium titanate ($Ba_x Sr_{1-x} TiO_3$). Since a refractive index layer can be varied rapidly by an applied voltage extremely wide bandwidth modulations can be achieved to produce correspondingly high data rate communication. It is to be understood that the ceramic layer can be comprised of any electro-responsive material having the properties described herein. The electro-responsive materials described herein such as $ZrO_2$, $BaLiF_3$, $Bi_2(SnO_3)_3$, $CaSnO_3$, $CaTiO_3$, $NiSnO_3$, $CaO$, $MnO_2$, $Al_2O_3$, $LiNbO_3$, and $Ba_x Sr_{1-x} TiO_3$ are examples, and as such are not intended to represent an exclusive list of materials used in the manufacture of a dielectric layer.

The present invention may be embodied in other specific forms without departing from the spirit or essential attributes thereof and, accordingly, reference should be made to the appended claims, rather than to the foregoing specification, as indicating the scope of the invention.

We claim:

1. A modulated retroflection system for secure communication and identification, comprising:
   (a) a transceiver at a fist location for transmitting a signal to a second location, and for receiving a modulated reflected signal from the second location, and
   (b) a transponder at the second location, the transponder receiving, modulating, and reflecting the signal back to the transceiver, the transponder comprising
   a retroreflector having at least one reflective surface coated with an electro-responsive material for modulating the reflection coefficient of the reflective surface thereby modulating the amplitude of the signal reflected from the reflective surface, and
   a modulator electrically connected to the electro-responsive material for applying a modulated bias voltage on the electro-responsive layer to modulate phase angle, refractive index, and dielectric constant of the material and thereby shift electrical phase of the reflected signal.

2. A modulated retroflection system according to claim 1, wherein the electro-responsive material is a ceramic material comprising a mixture of barium, strontium, and titanium oxides.

3. A modulated retroflection system according to claim 2, wherein the ceramic material mixture further comprises a material selected from the group consisting of $ZrO_2$, $BaLiF_3$, $Bi_2(SnO_3)_3$, $CaSnO_3$, $CaTiO_3$, $NiSnO_3$, $CaO$, $MnO_2$, $Al_2O_3$, and $LiNbO_3$.

4. A modulated retroflection system according to claim 1 wherein the electric phase of the modulated reflected signal is used for encoding communication and identification information onto the transmitted signal prior to it being reflected by the reflecting surface.

5. A modulated retroflection system according to claim 1, wherein the transceiver comprises
an antenna for transmitting the signal at the first location and for receiving the modulated reflected signal from the second location,
a frequency source for generating the signal,
a mixer having a first input electrically connected to the antenna, a second input electrically connected to the frequency source, and an output, the first input receiving the modulated reflected signal received by antenna, the second input receiving the transmitted signal generated by the frequency source, and the output providing a difference signal, the difference signal being the difference between the modulated reflected signal and the transmitted signal, the output being electrically connected to a detector for detecting the difference signal, and
a filter for filtering the detected difference signal and providing a filtered difference signal.

6. A modulated retroflection system for secure communication and identification between two locations using only a single transmitter, comprising:
(a) an interrogator at a first location, the interrogator including a transceiver for transmitting an interrogation signal to a second location and for receiving a modulated reflected interrogation signal from the second location, and
(b) a semi-passive transponder at the second location for receiving, modulating, and reflecting the interrogation signal back to the interrogator, the semi-passive transponder including
(i) a retroreflector having a dynamically controllable reflecting surface comprising
a front modulating layer of material having a electro-responsive refractive index, said refractive index being controlled by a first modulated bias voltage for shifting the electrical phase of the interrogation signal passing through said front layer,
an inner modulating and variably reflecting layer of material having an electro-responsive reflection coefficient, said reflection coefficient being controlled by a second modulated bias voltage for modulating the amplitude of the interrogation signal passing through said inner layer, and
a back layer of electro-magnetic absorbing for absorbing residual electro-magnetic energy passing through the front modulating layer and the inner modulating and variably reflecting layer,
the electro-responsive material comprising a mixture of barium, strontium, and titanium oxides, and
(ii) a modulator electrically connected to said dynamically controllable reflecting surface for applying the first modulate electro-response to the front modulating layer and for applying the second modulated electro-response to said inner modulating and variably reflecting layer, the first and the second modulated electro-response being used to modulate phase angle, refractive index, and dielectric constant of the electro-responsive material and thereby shift electrical phase of the reflected signal and for encoding communication and identification information onto the interrogation signal prior to it being reflected by the reflecting surface.

7. A modulated retroflection system according to claim 6, wherein the interrogator comprises
an antenna for transmitting the interrogation signal at the first location and for receiving the modulated interrogation signal being reflected back to the interrogator by the semi-passive transponder,
a frequency source for generating the interrogation signal,
a mixer having a first input electrically connected to the antenna, a second input electrically connected to the frequency source, and an output electrically connected to a detector, the first input being the received signal from the antenna, the second input being the interrogation signal generated by the frequency source, the output comprising a difference signal, the difference signal being the difference between the received signal and the interrogation signal, the detector detecting the difference signal, and
a filter having an input and an output, the input being electrically connected to the detector, the filter filtering the detected difference signal thereby providing a filtered difference signal at the output of the filter.

8. A modulated retroflection system according to claim 6, wherein the semi-passive transponder at the second location includes a second semi-passive transponder for allowing two-way communication with a second interrogator at a third location.

9. A modulated retroflection system according to claim 6, wherein the electro-responsive material further comprises a mixture of materials selected from a group consisting of $ZrO_2$, $BaLiF_3$, $Bi_2(SnO_3)_3$, $CaSnO_3$, $CaTiO_3$, $NiSnO_3$, $CaO$, $MnO_2$, $Al_2O_3$, and $LiNbO_3$.

10. A modulated retroflection system according to claim 6 wherein the modulator applies a modulation frequency in the range between about 300 Hz and about 300 MHZ.

11. A modulated retroflection system according to claim 6 wherein the transceiver has a frequency range between about 300 MHZ and about 300 GHz.

12. A modulated retroflection system for secure two-way communication and identification, comprising:
(a) a transceiver at a first location for transmitting a signal to a second location and for receiving a modulated reflected signal from the second location, the transceiver encoding communication and identification information onto the signal, and
(b) a transponder at the second location for reflecting the signal, the transponder encoding additional communication and identification information onto signal being reflected, the transponder comprising
a retroreflector having a first layer and a second layer composed of an electro-responsive material having a electro-responsive refractive index and a electro-responsive reflection coefficient,
said first layer for substantially modulating the electrical phase of the received signal, and said second layer for substantially modulating the amplitude and reflecting the received signal, said retroreflector further comprising a third surface for absorbing residual signal passing through the first and second layers, and
a modulator electrically connected to the first layer and the second layer for applying a first and a second modulated bias voltage respectively on the electro-responsive layers to modulate phase angle, refractive index, and dielectric constant of the electro-responsive material and thereby shift electrical phase of the reflected signal.

13. A modulated retroflection system for secure communication and identification, comprising:
  (a) a transceiver at a first location for transmitting a signal to a second location, and for receiving a modulated reflected signal from the second location, and
  (b) a transponder at the second location, the transponder phase shifting, amplitude modulating, and reflecting the signal back to the transceiver, the transponder comprising
  a retroreflector having a first layer composed of an electro-responsive material having a electro-responsive refractive index, said first layer for modulating the electrical phase of the received signal, said retroreflector further comprising a second surface for reflecting the signal passing through the first and layer, and
  a modulator electrically connected to the first layer for applying a modulated bias voltage to modulate phase angle, refractive index, and dielectric constant of the electro-responsive material and thereby shift electrical phase of the reflected signal.

14. A modulated retroflection system for secure communication and identification, the modulated retroflection system comprising:
  (a) a transceiver at a first location for transmitting a signal to a second location, and for receiving a modulated reflected signal from the second location, and
  (b) a transponder at the second location, the transponder phase shifting, amplitude modulating, and reflective the signal back to the transceiver, the transponder comprising
  a retroreflector having a first layer composed of an electro-responsive material having an electro-responsive reflection coefficient, said first layer for modulating the electrical phase of the received signal, and a second layer for modulating the amplitude and reflecting the received signal, said retroreflector further comprising a third surface for absorbing residual signal passing through the first and second layers, and
  a modulator electrically connected to the first layer and the second layer for applying a first, and a second independent modulated bias voltage respectively to modulate phase angle, refractive index, and dielectric constant of the electro-responsive material and thereby shift electrical phase of the reflected signal.

15. A method for secure communication and identification between two locations employing a modulated retroflection system, the system having a single transmitter associated therewith, the method comprising die steps of:
  (a) sending a signal having encoded communication and identification information from a first location to a second location,
  (b) receiving, and further encoding communication and identification friend or foe information on the signal reflected from the second location toward the first location, and
  (c) encoding the signal by modulating phase angle, refractive index, and dielectric constant of an electro-responsive reflecting surface and thereby shift electrical phase of the reflected signal by means of a modulated bias voltage supplied to the electro-responsive reflecting surface having a mixture of barium, strontium, and titanium oxides.

* * * * *